(12) United States Patent
Davies

(10) Patent No.: US 6,878,351 B1
(45) Date of Patent: Apr. 12, 2005

(54) CATALYST SUPPORT

(75) Inventor: Raymond Davies, Yarm (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/869,934

(22) PCT Filed: Dec. 10, 1999

(86) PCT No.: PCT/GB99/04188

§ 371 (c)(1), (2), (4) Date: Jul. 9, 2001

(87) PCT Pub. No.: WO00/40329

PCT Pub. Date: Jul. 13, 2000

(30) Foreign Application Priority Data

Jan. 8, 1999 (GB) .............................................. 9900314

(51) Int. Cl.$^7$ ................................................ B01J 10/00
(52) U.S. Cl. ....................................... 422/191; 422/143
(58) Field of Search ................................. 422/191, 143, 422/239, 311

(56) References Cited

U.S. PATENT DOCUMENTS

| | | | |
|---|---|---|---|
| 3,482,946 A | | 12/1969 | Shirk |
| 3,671,601 A | * | 6/1972 | Sanderson et al. .......... 585/451 |
| 4,195,064 A | * | 3/1980 | Betteken et al. ............ 422/191 |
| 5,092,350 A | * | 3/1992 | Arthur et al. ............... 131/281 |
| 5,492,617 A | * | 2/1996 | Trimble et al. ............. 208/148 |
| 5,890,789 A | * | 4/1999 | Inagaki et al. .............. 359/305 |
| 6,184,490 B1 | * | 2/2001 | Schweizer ............. 219/121.77 |
| 6,699,443 B1 | * | 3/2004 | Hourticolon et al. ....... 422/220 |

FOREIGN PATENT DOCUMENTS

| | | |
|---|---|---|
| DE | 3731988 | 4/1989 |
| FR | 2253554 | 7/1975 |

* cited by examiner

Primary Examiner—Kiley Stoner
Assistant Examiner—Jonathan Johnson
(74) Attorney, Agent, or Firm—Mayer Brown Rowe & Maw LLP

(57) ABSTRACT

A catalyst support structure e.g. for use in an ammonia oxidation reactor, comprising a series of primary supports (19) disposed above a catalyst bed, a lattice assembly disposed beneath the catalyst bed and on which the catalyst bed rests, said lattice assembly being suspended from the primary supports (19) by suspending means (27) extending through the catalyst bed. Preferably the support structure includes a static start-up burner arrangement in the form of one or more perforated tubes (24) adjacent the primary supports (19).

21 Claims, 7 Drawing Sheets

CATALYST SUPPORT

This application is the National Phase of International Application PCT/G99/04188 filed Dec. 10, 1999 which designated the U.S. and that International Application was published under PCT Article 21(2) in English.

This invention relates to a catalyst support and in particular to supporting catalysts for reactions effected at relatively high temperatures, especially in the manufacture of nitric acid by the oxidation of ammonia.

Heretofore in ammonia oxidation processes, the catalyst, often in the form of a stack or wad of wire gauzes or meshes of the active material, for example platinum, often in combination with other precious metals such as palladium, is supported on a lattice of steel beams disposed across the reaction vessel below the catalyst layer. Under conventional operating conditions, the reactants, e.g. a gaseous mixture of ammonia and air, are fed at an elevated temperature, typically in the range 100 to 300° C., to the vessel space above the catalyst. On passage through the catalyst, the reaction takes place: being a strongly exothermic reaction, the gas temperature rapidly increases, typically to a temperature in the range 800 to 950° C. Consequently the support lattice is exposed to such high temperatures. The reaction vessel is typically 2 to 6 m in diameter and so in order to withstand the high temperatures while supporting the catalyst without undue deformation, it has generally been necessary construct the lattice from relatively closely spaced steel beams of considerably depth, typically 15 to 30 cm, extending across the vessel. Such structures are heavy and, since they have to be constructed of materials that can withstand the harsh operating conditions, are expensive. Conventionally the lattice has been of a welded "bottle crate" construction. Not only is such an arrangement heavy and expensive but it is prone to buckling and damage: being of welded construction renders repair difficult and expensive.

We have realised that much lighter, and hence cheaper and more easily handled, support structures can be employed if the primary support is from above the catalyst bed where the prevailing conditions are not so extreme.

Accordingly the present invention provides a structure for supporting a catalyst bed in a vessel comprising a series of primary supports extending across the vessel and a lattice assembly carrying the catalyst bed disposed beneath the primary supports and suspended therefrom via suspending means extending through the catalyst bed.

The invention is illustrated by reference to the accompanying drawings in which.

Figure 1:
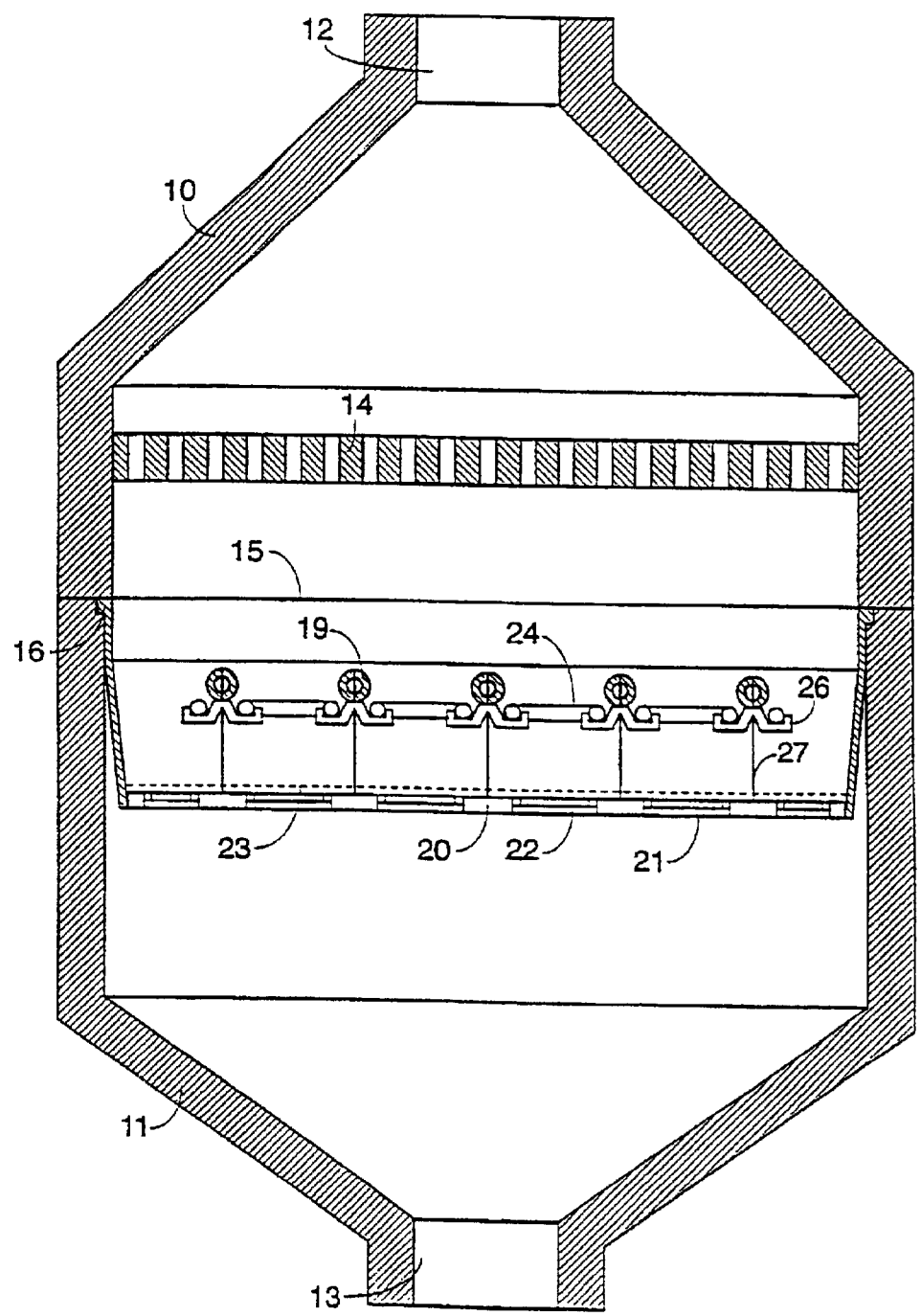
FIG. 1 is a diagrammatic vertical section through an ammonia oxidation reactor.

Referring to FIG. 1 an ammonia oxidation reactor consists of an outer shell of generally circular cross section formed as upper and lower shell members 10, 11, provided with a reactants inlet port 12 and a reaction products outlet port 13 respectively. The upper shell member is provided with a perforate diffuser plate 14 extending across the shell. The diameter of the reactor is typically about 4 m.

The lower shell member carries a skirt 15 located round the interior periphery of the vessel by means of an outwardly extending flange resting in a rebate 16 in the upper rim of the lower shell member 11. Skirt 15 has an upper cylindrical portion and then an inwardly tapered, i.e. frusto-conical, portion 17. Since, in operation the lower portion of the skirt is liable to be at a much higher temperature, e.g. about 900° C., than the upper portion which is typically at about 300° C., the conical configuration permits some differential thermal expansion of the lower portion of the skirt relative to the upper portion.

Figure 2:
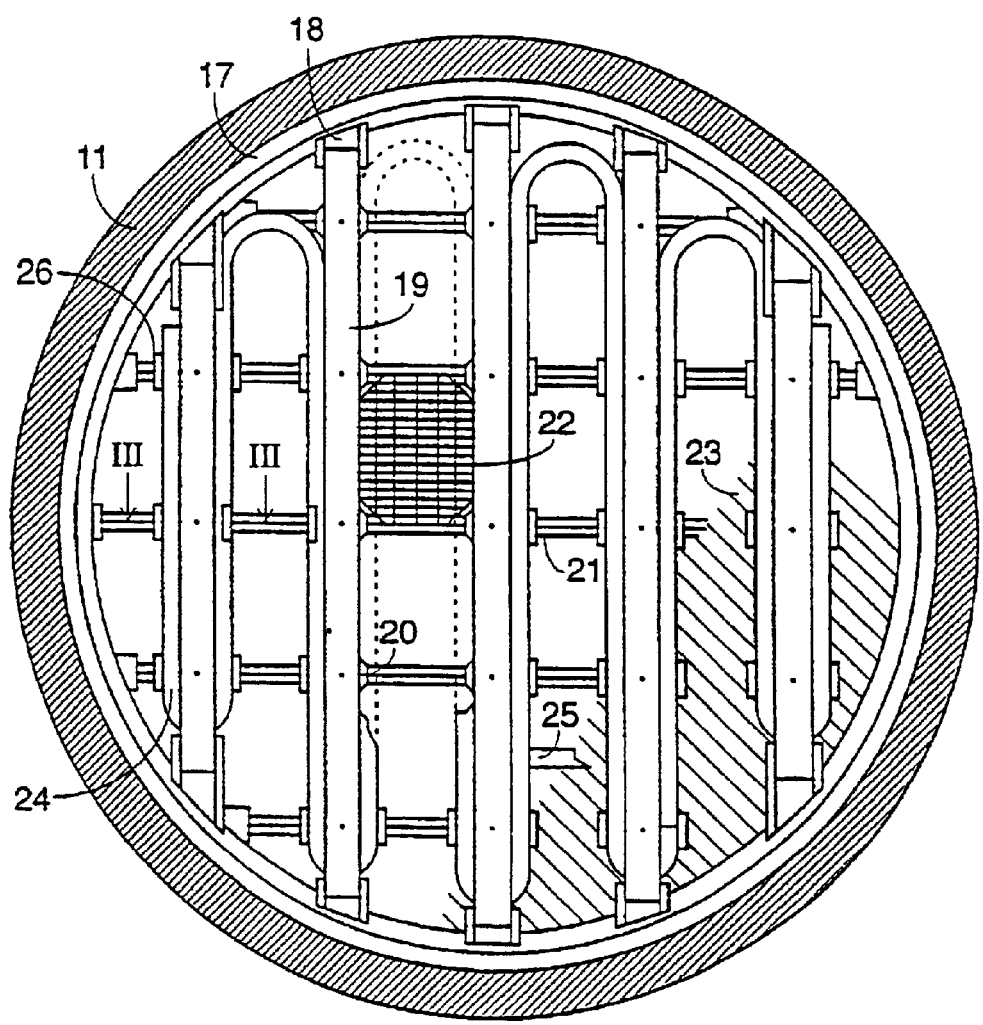
FIG. 2 is a plan of the reactor with the upper shell member removed.

As shown in FIG. 2, a number of channel sectioned supports 18 are welded to the upper part of the conical portion of the skirt in chordally disposed pairs. Typically there are five pairs of supports 18. Each pair of channel section supports carries a primary support member 19. These primary support members carry a lattice assembly: since the primary support members are located above the catalyst bed, they are disposed in the relatively cool part of the reactor and so do not need to be made from a material that can withstand the high temperatures encountered in or below the catalyst bed. The primary support members may be solid or hollow and may be of any convenient cross section. However they are preferably pipes, since pipes of suitable material and size are readily available. The number, configuration and size of the primary support members required will depend on the size of the reactor and the load to be supported. Typically with a reactor diameter of 4 m, there may be used five primary support members in the form of pipes of diameter about 10 cm spaced at about 80 cm intervals.

The lattice assembly comprises a plurality of base assemblies 20 connected by pairs of grid supports 21 and a plurality of grid assemblies 22 (only one of which is shown in FIG. 2) carried by the grid supports 21. As described hereinafter, the grid supports 21 are attached to the lower frusto-conical configuration portion 17 of the skirt member 15.

A number of base assemblies 20 are suspended from each primary support member 19. Typically these assemblies are disposed in a square configuration at a pitch corresponding to the spacing of the primary support members 19. The catalyst bed (shown by the dotted line 23 in FIG. 1 and only shown in part in FIG. 2) is disposed on top of the base and grid assemblies. Although preferred, it is not necessary that the base assemblies 20 are disposed in a square pattern: thus they may be disposed in other configurations, e.g. rectangular or triangular patterns.

Although the base and grid assemblies are located in the high temperature region of the reactor, the loads borne by the individual assemblies are relatively low. In particular there are no individual load bearing members extending across the whole span of the reactor in the high temperature region and so massive construction to withstand large deformation loads is not necessary. Consequently the mass of high temperature resistant materials is reduced.

Whereas in a conventional ammonia oxidation reactor, the reaction is initiated by heating the catalyst bed by means of a rotating burner directing a flame obtained by combusting a combustible gas e.g. hydrogen on to the catalyst bed, such a construction is not suitable in the present invention as any such burner would need to be disposed above the primary support members and so subject them to localised high temperatures during start-up.

Figure 3:
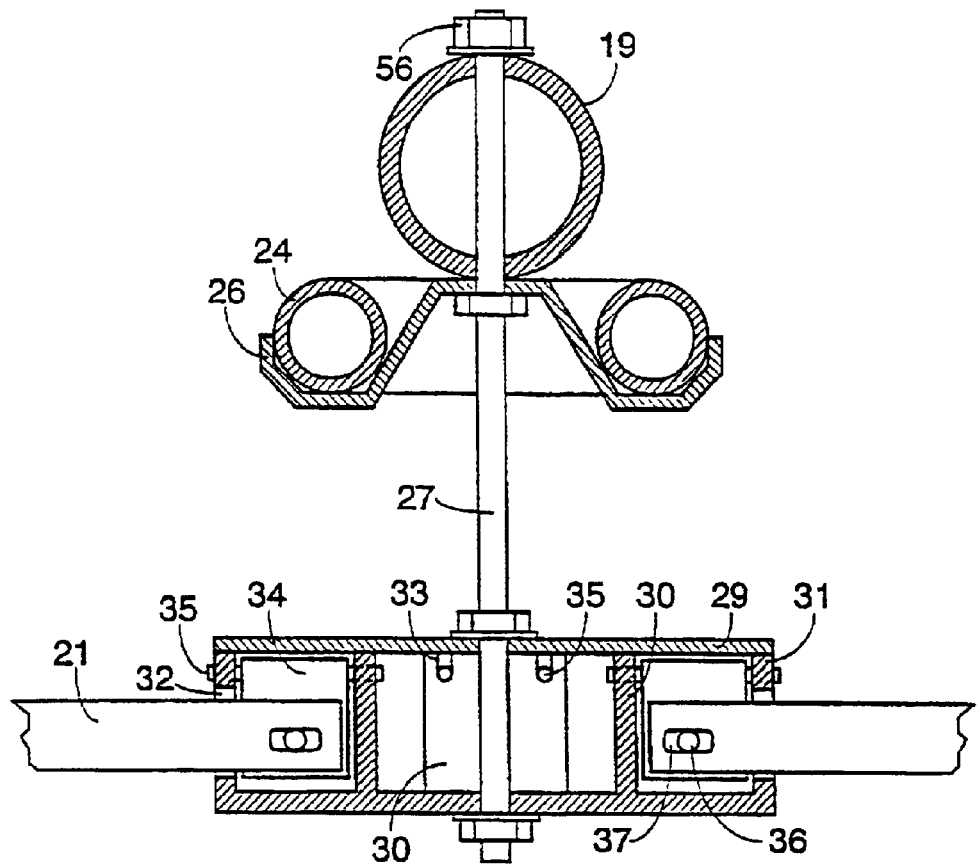
FIG. 3 is a section along the line III—III of FIG. 2.

In the present invention this problem is overcome by providing a static start-up burner arrangement in the form of one or more tubes adjacent the primary support members and means to supply a combustible gas thereto. The tube, or tubes, is provided with perforations (not shown) at intervals so that a flame can be directed down and, preferably, outwards from the tube on to the catalyst bed. As shown in FIGS. 1, 2 and 3, the start-up burner may comprise a single serpentine tube 24 adjacent the primary support members 19. For clarity, in FIG. 2, this serpentine tube is shown part in full and part by dotted lines. A fuel gas, for example hydrogen, may be fed to the serpentine tube 24 through a suitable inlet pipe 25 shown dotted in FIG. 2.

Referring to FIGS. 2 and 3, the serpentine tube 24 is supported on brackets 26 located at each base assembly suspension point. For clarity in FIG. 2, the brackets 26 are shown only at the locations where serpentine tube 24 is shown by full lines. As shown in FIG. 3, the brackets 26 and the base assemblies 20 are supported from primary support members 19 by tie rods 27. Although these tie rods are load bearing and subject to high temperatures at their lower ends, they are in tension and so not subject to buckling loads. To permit adjustment during assembly of the whole catalyst support structure, the location of the base assemblies 20 relative to the primary support members 19 is preferably by means of threaded pardons and nuts at the upper and/or the tower ends of the tie rods 27.

Figure 4:
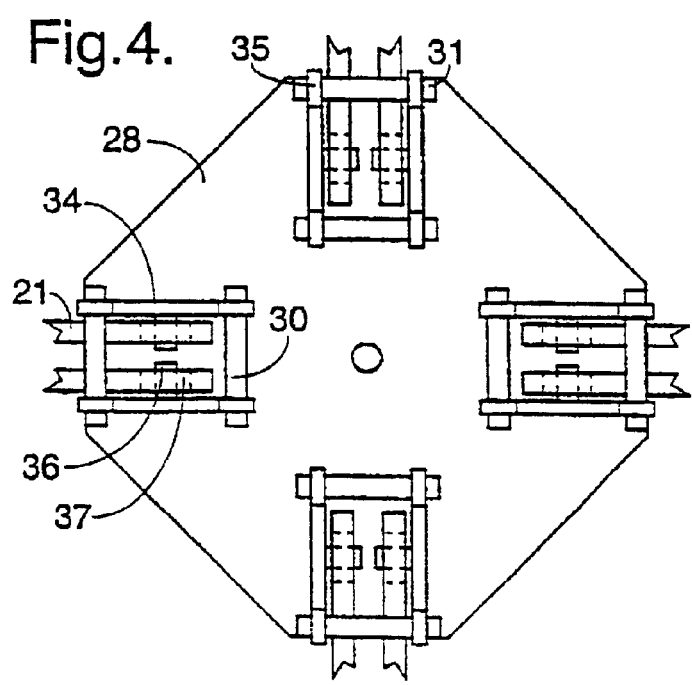
FIG. 4 is a plan of the base assembly of FIG. 3 with the primary support member assembly and cover plate removed.
Figure 5:
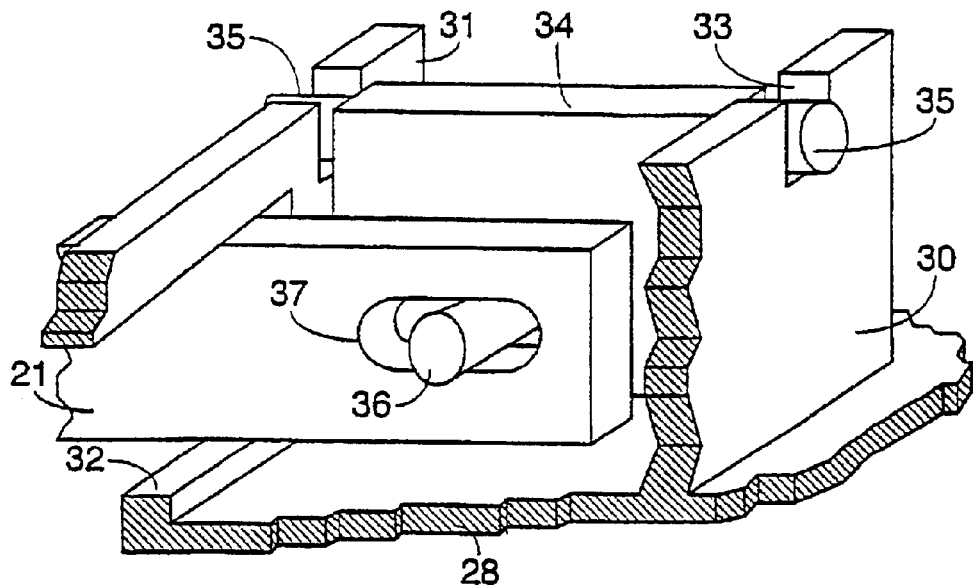
FIG. 5 is an isometric sketch of part of the base assembly.

The base assemblies 20 are shown in more detail in FIGS. 3, 4 and 5. Supported by each tie rod 27 is a base member 28, which is preferably a casting to avoid the need for welds, and a cover plate 29. Where the base assemblies 20 are disposed in a square or rectangular configuration, each base member 28 is preferably of octagonal configuration and has inner and outer upstands 30, 31, arranged in pairs. For a square or rectangular configuration of base assemblies 20, each base member 28 has four pairs of upstands.

Each outer upstand 31 is provided with a slot 32 through its wall. The inner and outer upstands are provided with two pairs of notches 33 in their upper surface (see FIG. 5). Located in each pair of notches 33 is a hinge member 34 having rounded projections 35 engaging with the notches. Each hinge member 34 is thus able to pivot relative to the inner and outer upstands. When assembled, the cover plate 29 of the base assembly 20 acts as a keeper to retain the projections 35 of hinge members 34 in the notches 33 of the upstands.

Each hinge member 34 is also provided with a pin 36, positioned at a location below the axis of projections 35, projecting from the hinge member 34 in a direction perpendicular to the axis of the rounded projections 35. A grid support 21 having an elongated slot 37 at each end is mounted on each pin 36 and extends through the slot 32 in the outer upstand 31. The grid support is thus supported by a pin 36 on a hinge member 34 pivoting in the base member 28 about an axis perpendicular to, but above, said pin. The grid supports 21 thus extend from the base member 28 in a direction parallel to the axis of the rounded projections 35. Each grid support 21 engages at its other end with a corresponding pin on a hinge member of an adjacent base assembly or with a pin connected to the periphery of the lower portion 17 of the skirt 15. The mounting of the grid supports at the periphery of the skirt is described hereinafter with reference to FIG. 9.

By virtue of the elongated slots 37, the grid supports 21 are free to move longitudinally with respect to the base members 28, and by virtue of the hinge members 34, are also free to swing laterally to permit displacement of the grid supports 21 in the lateral direction. Since each pair of notches 33 in the upstands 30, 31 carries a hinge member 34 and each hinge member 34 carries a grid support 21, the base assemblies 20 are connected by paws of grid supports 21 spaced apart from one another and free to move laterally and longitudinally relative to one another. The base assemblies 20, and hence tie rods 27, are thus not subjected to thermally induced lateral stresses and so forces tending to give rise to buckling are minimised.

Figure 6:
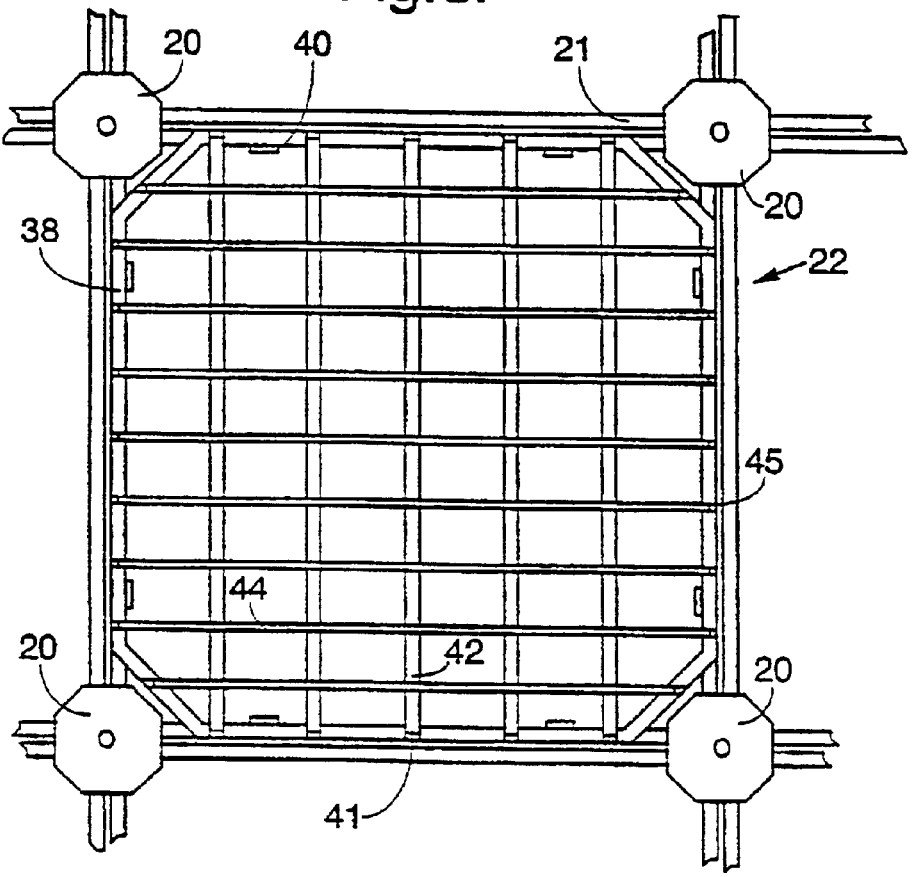
FIG. 6 is an enlarged plan of part of FIG. 2 showing four of the base assemblies and the gnd assembly supported thereby.

Referring to FIG. 6, where four adjacent base assemblies 20 are shown connected by pairs of grid supports 21. A grid assembly 22 is shown located on the inner grid support of each pair. The grid assembly comprises an outer octagonal ring member 38 dimensioned such that it can expand through thermal expansion without imposing undue forces on adjacent grid assemblies on the other gnd supports of the grid support pairs and on the base assemblies 20. To avoid welds, the ring 38 may be simply be of bent metal construction. Ring member 38 is provided with downwardly extending locating lugs 40 which serve to position the grid assembly relative to the grid supports 21. Expansion of ring 38 thus causes the grid supports 21 to move longitudinally and laterally but, as previously described, because of the mounting of the grid supports 21 via hinge members 34 and elongated slots 37 in the ends of the grid supports 21, such longitudinal and lateral movement does not give rise to buckling forces on the base assemblies 20 and tie rods 27.

Figure 7:
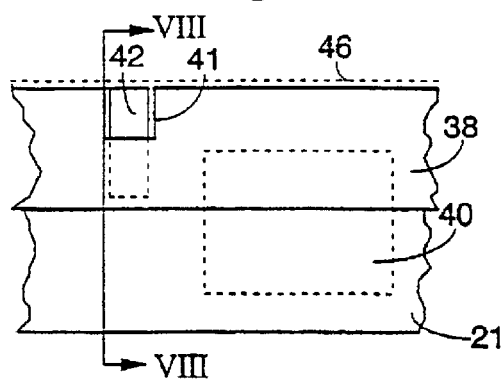
FIG. 7 is an elevation of part of the grid assembly.
Figure 8:
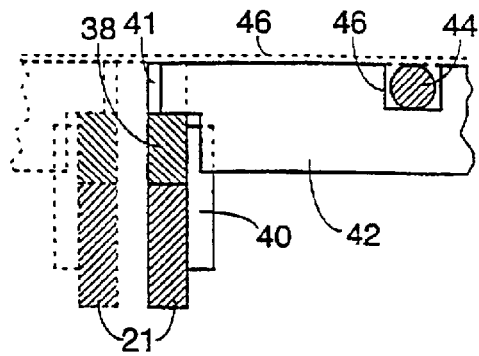
FIG. 8 is a section along the line VIII—VIII of FIG. 7 showing an adjacent grid assembly in broken lines.

As shown in FIGS. 6, 7 and 8, the opposed sides of the ring member 38 are provided with a plurality of notches in the upper surface: The notches 41 in one pair of opposed sides serve to support rebated cross bars 42 which in turn have notches 43 which support rods 44. The ends of rods 44 are located in notches 45 in the other pair of opposed sides of ring member 38. The upper surfaces of the cross bars 42, rods 44, and ring 38 are preferably substantially co-planar with the upper surface of the cover plates 29. The notches, rebates on bars 42, and the lengths of the bars and rods are dimensioned such that relative movement is possible to accommodate thermal expansion. The number and spacing of the rods and bars will depend on the tolerable "sag" of the catalyst layer disposed above the grid assemblies. Generally, as hereinafter described, a wire mesh 46 is disposed on top of the grid assemblies to act as a support between adjacent cross bars and rods. Typically the spacing between adjacent cross bars and between adjacent rods is in the range 2 to 15 cm, particularly in the range 3 to 12 cm. It will be appreciated that it is not necessary that the spacing between adjacent cross bars 42 is the same as the spacing between adjacent rods 44.

Figure 9:
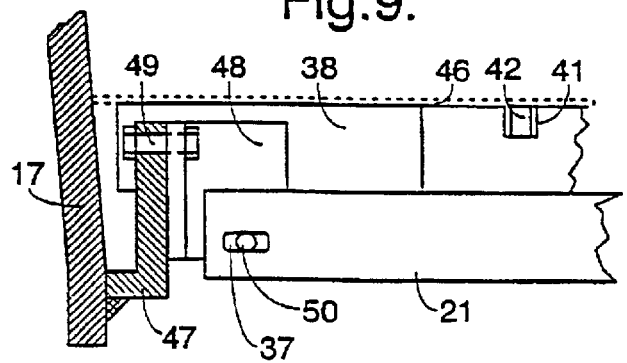
FIG. 9 is a section of part of the skirt illustrating the method of supporting the grid assembly at the walls of the vessel.
Figure 10:
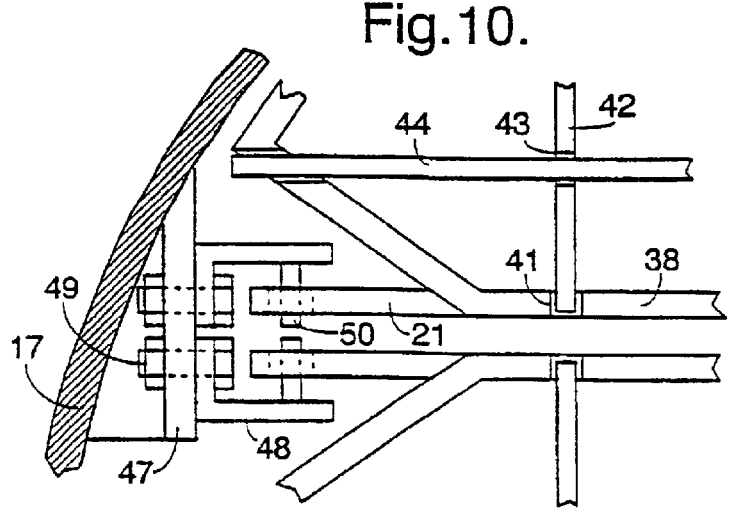
FIG. 10 is a plan view of the arrangement of FIG. 9.

In FIGS. 9 and 10, the mounting of the grid supports 21 at the periphery of the skirt is shown. In FIG. 10, the mesh 46 is omitted for clarity. At the requisite locations, brackets 47 are welded to the lower conical portion 17 of the skirt. A pair of hinge members 48 are pivoted in each bracket about an axis parallel to the length of the grid supports 21 by means of hinge pins 49. Each hinge member 48 has a pin 50 extending laterally from the hinge member but displaced vertically from the hinge pin 49. Each pin 50 engages with the elongated slot 37 in the end of the associated grid support 21. It will be appreciated that the ring members adjacent the periphery of the skirt will be shaped to conform to the areas enclosed by the skirt and the grip supports 21.

By arranging that the hinge members 34, 48 are pivoted at a location above the pins 36, 50 supporting the gnd supports 21, the grid supports 21 will tend to be in their lowest position when the assembly is assembled at ambient temperature and differential thermal expansion will cause pivoting of the hinge members 34, 48 with consequent lateral movement accompanied by slight raising of the grid supports 21. On cooling and contraction of the assembly, the hinge members will thus tend to revert towards their lowest position.

Figure 11:
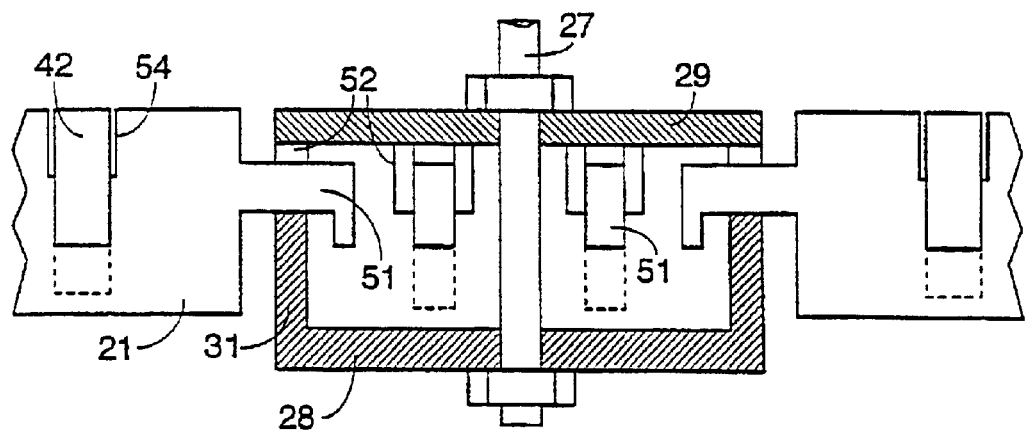
FIG. 11 is a view similar to the lower part of FIG. 3 showing an alternative embodiment.
Figure 12:
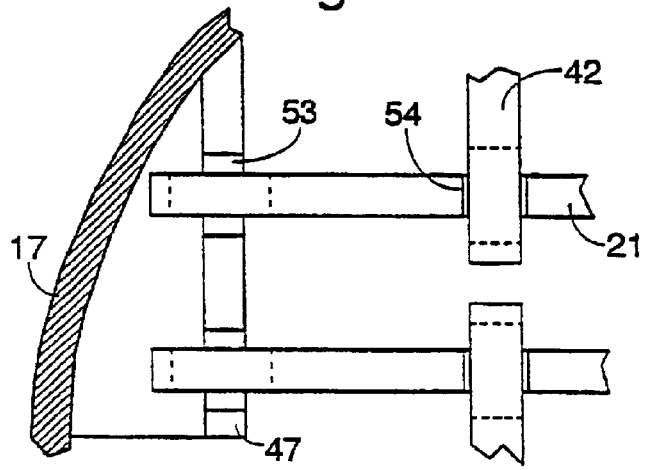
FIG. 12 is a view similar to FIG. 10 illustrating the method of supporting the grid assembly at the walls of the vessel for the alternative embodiment.
Figure 13:
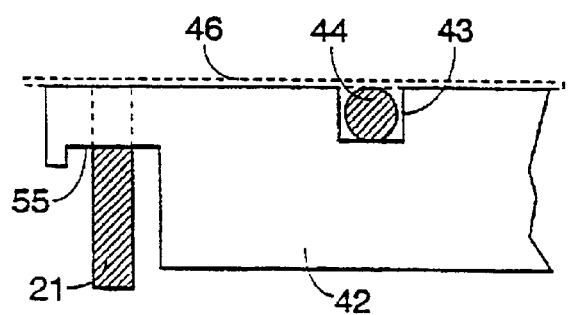
FIG. 13 is a view similar to that of FIG. 8 showing the alterative embodiment.

In an alternative embodiment, as shown in FIGS. 11, 12 and 13, a simpler construction may be employed, omitting the hinge members. In this embodiment, each grid support 21 has a projecting notched lug 51 at each end which engages in an elongated slot or notch 52 in the outer upstand 31 of the base member 28 and the inner upstand is omitted. Similarly at the periphery of the skirt, the lugs 51 engage with slots or notches 53 in the brackets 47 fastened to the lower portion 17 of the skirt. The grid supports 21 are thus free to expand longitudinally and to move laterally in the slots 52 and 53. In this embodiment the octagonal ring member is omitted and the cross bars 42 are mounted in notches 54 in the upper surface of the grid supports 36. The ends of the cross bars 42 are provided with notches 55 which engage with the notches 54 in the grid supports. On thermal expansion or contraction of the cross bars 42, the grid supports 21 are thus moved laterally in slots or notches 52, 53. By virtue of the notches 55, on contraction on cooling, the grid supports tend to return to their cold, undisplaced position.

It will be appreciated that the whole supporting assembly can be constructed simply by supporting the base members 28 (having the tie rods 27 extending upwardly therefrom) and skirt 15 (having its channel section supports 18 and flanges 47 welded or otherwise fastened thereto) on a suitable substrate: the grid supports 21 (and, if used, hinge members 34, 48) are then located on the base members 28 and flanges 47. The octagonal rings 38 (if used) are then positioned on the grid supports 21 and cross bars 42 located in the appropriate notches 41 or 54. The rods 44 are then positioned in the notches 43 in the cross bars 42, cover plates 29 positioned and then the wire mesh 46, having holes at intervals for the tie rods 27, is laid over the rods 44 and cover plates 29. The wire mesh, preferably in a single piece, extends all over the area of the skirt and may be fastened to the periphery thereof, e.g. by welds, if desired. The catalyst, which may be a wad of wire gauzes or particulate, is then disposed above the mesh 46. The brackets 26, serpentine tube 24 and primary support members 19 are then positioned on the tie rods 27 with the primary support members 19 resting in the channel section supports 18. A nut 56 (See FIG. 3) is then applied to the upper end of each tie rod 27. The skirt 15 carrying the whole assembly can then be lifted and placed in the reactor.

In the embodiment described above, the catalyst bed is heated to the ignition temperature by combusting a gas supplied via the serpentine tube 24. While this allows all of the bed to be heated simultaneously, this arrangement may present practical difficulties in view of the relatively large amount of fuel gas, e.g. hydrogen required. An alternative arrangement is to heat the sections of the bed in turn. This may be achieved by replacing the serpentine tube by a number of separate tubes parallel with each primary support member with means to isolate each tube from the gas supply except when it is desired to heat the section of the catalyst bed below that tube.

In another arrangement the primary support members may be disposed radially, instead of parallel to one another, thus providing sectors of the lattice assembly that are free from tie rods. In this case the primary support members may be displaced vertically relative to one another so that they cross over one another at the center of the apparatus. In this way the need for a welded junction member at the centre can be avoided. The start-up heater can then be in the form of a plurality of radially extending burner tubes having a plurality of perforations disposed so that a flame can be directed down from the tube or tubes on to the catalyst bed, and means are provided to oscillate the radially extending burner tubes about the longitudinal axis of the apparatus below the primary support members across the sectors between the tie rods. The radially extending burner tubes are supplied with the fuel gas from a central supply pipe.

Figure 14:
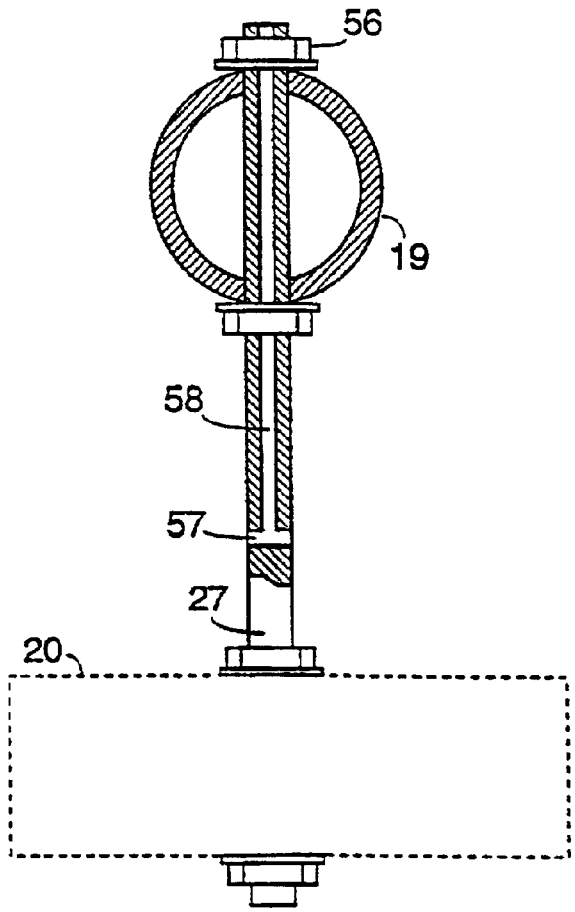
FIG. 14 is a view similar to FIG. 3 showing an alternative start-up burner arrangement.
Figure 15:
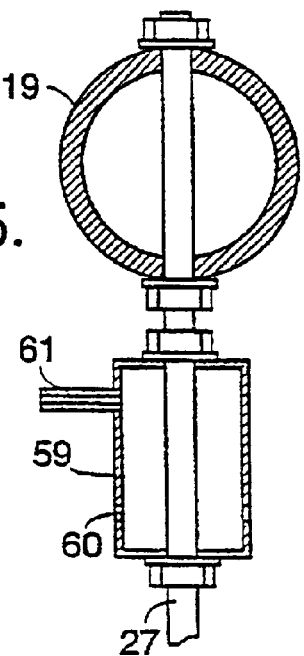
FIG. 15 is a view similar to FIG. 14 showing another start-up burner arrangement.

Alternative, preferred, start-up burner arrangements are shown in the embodiments of FIGS. 14 and 15. In the arrangement of FIG. 14, which is a view similar to that of FIG. 3 with the base assembly 20 shown dotted, the serpentine tube 24 and its support brackets 26 are omitted and the tie rods 27 are hollow for part of their length. Radial holes 57 are bored at a suitable location above the catalyst bed to communicate with the hollow interior 58 of the tie rods 27 and so provide burner orifices. To effect start-up, a fuel gas, e.g. hydrogen, is supplied to the upper end of the hollow interior 58 of the tie rod by means not shown and flows down through the hollow interior of the tie rod and emerges through the burner orifices where it combusts to provide a flame to heat the catalyst bed.

It will be appreciated that the tie rod may be a tube with a suitable cap or plug at its lower end. Alternatively each tie rod may be constructed in sections; for example a solid rod lower section and an upper tubular section and these may be welded or screw-threaded together.

In the arrangement of FIG. 15, which is similar to FIG. 14 but showing just the upper part of the tie rod assembly, each tie rod is provided, above the catalyst bed, with a burner assembly in the form of an enclosure in the form of a hollow cylindrical casing 59 provided with perforations 60 at suitable locations to form burner orifices and a fuel gas feed tube 61.

It will be appreciated that in the arrangements of FIGS. 14 and 15, the burner orifices may be inclined to direct the flame down on to the catalyst bed if desired. Where the base assemblies 20 and tie rods 27 are disposed in a square configuration, as in FIG. 2, each tie rod may be provided with four burner orifices directed towards the tie rod that is disposed diagonally opposite in the aforesaid square configuration. It will also be appreciated that in some cases it may not be necessary to provide each tie rod with a burner arrangement; for example alternate tie rods may be so provided. A suitable igniter, e.g. a spark plug, (not shown), may be provided to effect ignition of the fuel. Since the flame can propagate from one burner to another, it is not necessary to provide each burner with such ignition means.

The catalyst may be, as mentioned above, a wad of meshes or gauzes of a precious metal, e.g. platinum alloyed with rhodium, or alternatively may be a fixed bed of a particulate catalyst for example a rare earth/cobalt oxides composition as described in our WO 98/28073.

What is claimed is:

1. A structure for supporting a catalyst bed in a vessel comprising a series of primary supports extending across the vessel and a lattice assembly carrying the catalyst bed disposed beneath the primary supports and suspended therefrom via suspending means extending through the catalyst bed.

2. A structure according to claim 1 wherein the primary supports extend chordally across the vessel.

3. A structure according to claim 1 wherein the lattice assembly comprises a plurality of base assemblies and a plurality of grid assemblies carried by the base assemblies.

4. A structure according to claim 3 wherein the base assemblies are suspended from the primary supports by tie rods.

5. A structure according to claim 4 wherein the base assemblies are disposed in a square configuration.

6. A structure according to claim 4 wherein the base assemblies comprises base members connected by pairs of grid supports supported by the base members and capable of longitudinal and lateral movement relative to one another and relative to the base members.

7. A structure according to claim 6 wherein the grid supports are supported by pins to hinge members pivoting in the base members about an axis perpendicular to, but above, said pins.

8. A structure according to claim 6 wherein a grid assembly is supported by the inner one of each pair of grid supports connecting adjacent base members.

9. A structure according to claim 8 wherein the grid assembly comprises members extending across the area enclosed by said inner grid supports but free to move longitudinally relative thereto.

10. A structure according to claim 9 wherein said grid assembly includes a ring member engaging with said inner grid supports, and said members extending across the area enclosed by said inner grid supports are located in notched in the upper surface of said ring member.

11. A structure according to claim 1 for use for the oxidation of ammonia wherein the catalyst bed comprises a wad of gauzes or meshes of precious metal.

12. A structure according to claim 1 for use for the oxidation of ammonia wherein the catalyst bed comprises a fixed bed of particles of a rare earth/cobalt oxides composition.

13. A structure according to claim 1 wherein the primary members are disposed radially.

14. A structure according to claim 1 including a static start-up burner arrangement in the form of one or more perforate tubes adjacent to the primary supports and supplying means to supply a combustible gas to said tube or tubes, the perforation in said tube or tubes being dispersed so that a flame can be directed down from the tube or tubes in a catalyst bed.

15. A structure according to claim 14 wherein said start-up burner comprises a single perforate tube disposed adjacent the primary supports in a serpentine configuration.

16. A structure according to claim 1 wherein the suspending means comprises tie rods and at least some of which are provided with a start-up burner arrangement.

17. A structure according to claim 16 wherein at least some of the tie rods are hollow and have radial holes therein and supplying means are provided to supply a fuel gas to the interior of said hollow rods.

18. A structure according to claim 16 wherein at least some of the tie rods are provided with an enclosure surrounding the tie rod for at least part of its length, said enclosure being provided with burner orifices and supplying means to supply fuel gas to said enclosure.

19. A structure according to claim 13 including a start-up burner arrangement in the form of a plurality of radially extending burner tubes one for each sector, each tube having a plurality of perforations disposed so that a flame can be directed down from the tube or tubes on the catalyst bed, and oscillating means are provided to oscillate the radially extending burner tubes about the longitudinal axis of the apparatus below the primary support members.

20. A structure according to claim 1 wherein said primary supports are carried by a skirt member located round the interior periphery of the vessel.

21. A structure to claim 20 wherein the lower portion of the skirt member is of frusto-conical configuration, and the lattice assembly is attached at intervals to said lower portion.

* * * * *

UNITED STATES PATENT AND TRADEMARK OFFICE
CERTIFICATE OF CORRECTION

PATENT NO. : 6,878,351 B1
APPLICATION NO. : 09/869934
DATED : April 12, 2005
INVENTOR(S) : Raymond Davies Page 1 of 1

It is certified that error appears in the above-identified patent and that said Letters Patent is hereby corrected as shown below:

Title Page, Col. 1, shold read;
(73) Assignee: Johnson Matthey PLC, London (GB)

Signed and Sealed this

Fifth Day of September, 2006

JON W. DUDAS
*Director of the United States Patent and Trademark Office*